(12) United States Patent
Kowada

(10) Patent No.: US 12,092,746 B2
(45) Date of Patent: Sep. 17, 2024

(54) GNSS RECEIVING DEVICE

(71) Applicant: Furuno Electric Co., Ltd., Nishinomiya (JP)

(72) Inventor: Shinya Kowada, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 387 days.

(21) Appl. No.: 17/308,755

(22) Filed: May 5, 2021

(65) Prior Publication Data

US 2021/0255332 A1 Aug. 19, 2021

Related U.S. Application Data

(63) Continuation of application No. PCT/JP2019/038701, filed on Oct. 1, 2019.

(30) Foreign Application Priority Data

Nov. 12, 2018 (JP) .................. 2018-211883

(51) Int. Cl.
 *G01S 19/24* (2010.01)
 *G01S 19/01* (2010.01)
 (Continued)

(52) U.S. Cl.
 CPC .......... *G01S 19/243* (2013.01); *G01S 19/015* (2013.01); *G01S 19/07* (2013.01); *G01S 19/08* (2013.01); *G01S 19/10* (2013.01); *G01S 19/256* (2013.01)

(58) Field of Classification Search
 CPC ...... G01S 19/243; G01S 19/015; G01S 19/07; G01S 19/08; G01S 19/10; G01S 19/256; G01S 19/215
 See application file for complete search history.

(56) References Cited

U.S. PATENT DOCUMENTS 6,961,017 B1\* 11/2005 Naylor ..................... H04K 3/90
  342/357.29
10,466,700 B1\* 11/2019 Carmack .............. G08G 5/0069
  (Continued)

FOREIGN PATENT DOCUMENTS

EP 2746813 A1 6/2014
EP 2843441 A1 3/2015
  (Continued)

OTHER PUBLICATIONS

European Patent Office, Extended European Search Report Issued in Application No. 19885152.9, Jul. 25, 2022, Germany, 8 pages.

*Primary Examiner* — Bernarr E Gregory
*Assistant Examiner* — Hailey R Le
(74) *Attorney, Agent, or Firm* — Alleman Hall & Tuttle LLP

(57) ABSTRACT

A GNSS receiver includes a demodulation module, a position calculation module, a storage, and a determination module. The demodulation module receives the GNSS signal and acquires a navigation message. The position calculation module performs positioning calculation based on a propagation delay which is a time until a GNSS signal transmitted from a GNSS satellite reaches an antenna. The storage stores reception timing (reference timing) of a message of a predetermined type in the navigation message. The determination module determines that a GNSS signal including the navigation message is a spoofed GNSS signal when the difference between the reception timing of the next and subsequent messages of the same type predicted from the reference timing and the reception timing of the same type of message received after the reference timing is outside the scope of the time threshold.

16 Claims, 2 Drawing Sheets

(51) Int. Cl.
*G01S 19/07* (2010.01)
*G01S 19/08* (2010.01)
*G01S 19/10* (2010.01)
*G01S 19/25* (2010.01)

(56) References Cited

U.S. PATENT DOCUMENTS

| | | | |
|---|---|---|---|
| 2010/0117899 A1* | 5/2010 | Papadimitratos | G01S 19/20 |
| | | | 342/357.62 |
| 2010/0164787 A1* | 7/2010 | Khosravy | G01S 19/25 |
| | | | 342/357.25 |
| 2012/0319897 A1 | 12/2012 | Wendel et al. | |
| 2014/0038536 A1* | 2/2014 | Welnick | H04B 1/1027 |
| | | | 455/154.1 |
| 2014/0198784 A1* | 7/2014 | Nakajima | H04L 1/203 |
| | | | 370/350 |
| 2015/0048973 A1* | 2/2015 | Whitehead | G01S 19/215 |
| | | | 342/357.58 |
| 2015/0097721 A1 | 4/2015 | Broussalian | |
| 2015/0116148 A1* | 4/2015 | Kim | G01S 19/215 |
| | | | 342/357.59 |
| 2016/0370470 A1 | 12/2016 | Mabuchi et al. | |
| 2017/0070971 A1* | 3/2017 | Wietfeldt | H04W 24/10 |
| 2017/0299730 A1* | 10/2017 | Lie | G01S 19/426 |
| 2018/0136339 A1* | 5/2018 | Paek | G01S 19/44 |
| 2018/0224557 A1* | 8/2018 | McMilin | H04K 3/28 |
| 2018/0259650 A1* | 9/2018 | Antoni | G01S 19/426 |

FOREIGN PATENT DOCUMENTS

| | | |
|---|---|---|
| EP | 3109670 A1 | 12/2016 |
| JP | 2011041038 A | 2/2011 |
| JP | 2013004098 A | 1/2013 |
| JP | 201514474 A | 1/2015 |
| JP | 2015175812 A | 10/2015 |
| JP | 2018163040 A | 10/2018 |
| WO | 2014047378 A1 | 3/2014 |

* cited by examiner

GNSS RECEIVING DEVICE

CROSS-REFERENCE TO RELATED APPLICATION(S)

This application is a continuation of PCT International Application No. PCT/JP2019/038701, which was filed on Oct. 1, 2019, and which claims priority to Japanese Patent Application Ser. No. 2018-211883 filed on Nov. 12, 2018, the entire disclosures of each of which are herein incorporated by reference for all purposes.

TECHNICAL FIELD

The present invention relates generally to a GNSS receiver (GNSS receiving device) for receiving GNSS signals.

BACKGROUND

Conventionally, there has been known a position confirmation system capable of determining whether position information obtained based on GNSS positioning is the position information obtained from a signal originating from a satellite or the position information obtained from a spoofing signal. Patent Document 1 discloses such a position confirmation system.

That is, Patent Document 1 discloses a position confirmation system including a terminal device and a management server. The terminal device has a function of receiving a satellite radio wave and analyzing a navigation message included in the satellite radio wave to acquire position information relating to a present location. The terminal device can be moved by being carried by an operator or the like, and is positioned in zones A, B, C or the like which are geographical areas. The terminal device outputs the acquired position information and a zone identifier associated with a zone A or the like including the present location indicated by the position information to the management server. The management server acquires an authentication zone which is a geographical area corresponding to the zone identifier from a database, and has a function of authenticating whether or not a current position of the terminal device is located in the authentication zone.

[Patent Document 1] Publication of Japanese Utility Patent Application Publication No. 2005-80084

SUMMARY

However, in the configuration of Patent Document 1, information on a zone identifier is required in order to detect spoofing of the position of a terminal device. Therefore, when the information cannot be obtained, it is not possible to detect that the erroneous position information obtained by using a spoofing signal is transmitted from the terminal device, and there is a room for improvement in that as it is not possible to detect that the terminal device is receiving the spoofing signal.

It is an object of the present invention to provide a GNSS receiver capable of easily determining whether or not a spoofed signal is included in a received GNSS signal.

The problem to be solved by the present invention is as described above, and next, a means for solving the problem and the effect thereof will be described.

According to a first aspect of the present invention, there is provided a GNSS receiver having the following configuration. That is, the GNSS receiver includes a demodulation module, a position calculation module, a storage, and a determination module. The demodulation module receives a GNSS signal broadcast from a GNSS satellite and acquires a navigation message. The position calculation module performs positioning calculation based on a propagation delay, which is a time required for the GNSS signal transmitted from the GNSS satellite, to reach an antenna. The storage stores reference timing that is a timing of receiving a navigation message of a predetermined type. When a timing difference, which is a difference between predicted reception timing of the next and subsequent messages of the same type predicted based on the reference timing stored in the storage and actual reception timing of the same type of navigation message after the reference timing, is outside a predetermined time threshold range, the determination module determines that the GNSS signal including the subsequent navigation messages is a spoofed GNSS signal until the timing difference falls within the predetermined time threshold range.

That is, it is conceivable that the spoofed GNSS signal is received at a timing different from a reception period of the normal GNSS signal. Therefore, the reception timing of the navigation message relating to the spoofed GNSS signal may largely deviate from the period of the reception timing of the navigation message relating to the normal GNSS signal. Therefore, the spoofing GNSS signal can be discriminated well by paying attention to the difference in reception timing of the same type of messages included in the navigation message.

According to a second aspect of the present invention, there is provided a GNSS receiver having the following configuration. That is, the GNSS receiver includes a demodulation module, a position calculation module, and a determination module. The demodulation module receives a GNSS signal broadcast from a GNSS satellite and obtains a navigation message. The position calculation module performs positioning calculation based on a propagation delay, which is a time required for the GNSS signal transmitted from the GNSS satellite, to reach an antenna. The determination module determines that the received GNSS signal is a spoofed GNSS signal when an integer millisecond, which is an integer portion when the propagation delay is expressed in milliseconds, is different from a predefined value.

That is, since the position of a transmission source of the spoofed GNSS signal is significantly different from a position of the GNSS satellite which is the transmission source of the normal GNSS signal, the propagation delay of the spoofed GNSS signal may be significantly different from the normal GNSS signal. Therefore, the spoofed GNSS signal can be discriminated well by paying attention to a value of the propagation delay in integer milliseconds.

The GNSS receiver preferably has the following configuration. The GNSS receiver includes an output interface configured to output acquired information to an external device. The determination module determines whether or not the GNSS signal is the spoofed GNSS signal for each satellite. The output interface outputs the acquired information on spoofed GNSS signals for each satellite to the external device.

Thus, the spoofed GNSS signal can be discriminated for each satellite, and the acquired information on the spoofed signal for each satellite can be informed to a user.

The GNSS receiver preferably has the following configuration. That is, the antenna configured to receive the GNSS signal is fixedly installed. The determination module determines that at least one of a plurality of received GNSS signals is a spoofed GNSS signal when a current antenna position obtained by positioning calculation using the plurality of received GNSS signals varies from a preset antenna position or an antenna position by past positioning calculation by a predetermined amount or more.

That is, if the antenna is fixed, the position of the antenna by the positioning calculation based on the normal GNSS signal should not change. In the above configuration, the spoofed GNSS signal can be discriminated using this property.

The GNSS receiver preferably has the following configuration. That is, the GNSS receiver includes a signal selection module configured to select a GNSS signal of the plurality of received GNSS signals that is not determined to be a spoofed GNSS signal by the determination module. The positioning calculation is performed by using the GNSS signal selected by the signal selection module.

As a result, since the positioning calculation can be performed in a form excluding the spoofed GNSS signal, a better positioning result can be obtained.

The GNSS receiver preferably has the following configuration. That is, the GNSS receiver includes an assist GNSS information acquisition module configured to acquire assist GNSS information. When there is a difference between information obtained by demodulating the received GNSS signal and information obtained from the assist GNSS information with respect to at least one of orbit information of the satellite, health information of the satellite, time correction information of the clock provided by the satellite, and leap second information, the determination module determines that the received GNSS signal is a spoofed GNSS signal.

Thus, the spoofed GNSS signal can be excellently discriminated by using the assist GNSS information.

In the GNSS receiver, the determination module preferably determines that the GNSS signal is a spoofed GNSS signal when a signal strength of the received GNSS signal is equal to or greater than a corresponding threshold value.

Thus, when the signal strength of the received GNSS signal is unusually large, it can be determined that it is a spoofed GNSS signal.

In the GNSS receiver, it is preferable that the determination module determines that the GNSS signals of a plurality of PRN codes are spoofed GNSS signals when a difference in signal strengths of the GNSS signals of the plurality of PRN codes is within a corresponding threshold value.

That is, when the signal strengths of GNSS signals relating to a plurality of PRN codes are so similar that it is not normally considered, it is highly likely that spoofed GNSS signals of a plurality of PRN codes are transmitted from the same transmission source, and therefore it can be determined that the GNSS signals are spoofed GNSS signals.

The GNSS receiver preferably has the following configuration. That is, when the GNSS signals of first and second PRN codes of the plurality of PRN codes, are respectively received, and an elevation angle obtained from orbit information of the satellite corresponding to the first PRN code is higher than an elevation angle obtained from orbit information for the satellite corresponding to the second PRN code, and the signal strength of the GNSS signal of the first PRN code is smaller than the signal strength of the GNSS signal of the second PRN code, the determination module determines that at least one of the GNSS signal of the first PRN code and the GNSS signal of the second PRN code is a spoofed GNSS signal.

That is, the GNSS signal of the PRN code corresponding to the satellite of the high elevation angle should have a large signal strength. This property can be used to determine spoofed GNSS signals.

In the GNSS receiver, it is preferable that the determination module determines that the GNSS signal is a spoofed GNSS signal when a change in the signal strength of the received GNSS signal within a predetermined time period is within a corresponding threshold value.

That is, since the GNSS satellite transmits the GNSS signal while moving along a predetermined orbit, the signal strength of the GNSS signal related to the same PRN code usually varies to a certain degree with the passage of time. This property can be used to determine spoofed GNSS signals.

According to a third aspect of the present invention, the following GNSS receiving method is provided. That is, a navigation message is acquired by receiving a GNSS signal broadcast from a GNSS satellite. A positioning calculation is performed based on a propagation delay, which is a time required for the GNSS signal transmitted from the GNSS satellite, to reach an antenna. A reference timing which is a timing of receiving a predetermined type of navigation message is stored. When a timing difference, which is a difference between predicted reception timing of the next and subsequent navigation messages of the same type predicted based on the stored reference timing and the reception timing of the same type of navigation message after the reference timing, deviates from a predetermined time threshold range, the GNSS signal including the subsequent navigation message is determined to be a spoofed GNSS signal until the timing difference falls within the range of the predetermined time threshold range.

That is, it is conceivable that the spoofed GNSS signal is received at a timing different from the reception period of the normal GNSS signal. Therefore, the reception timing of the navigation message with respect to the spoofed GNSS signal may largely deviate from the period of the reception timing of the navigation message with respect to the normal GNSS signal. Therefore, the spoofed GNSS signal can be discriminated well by paying attention to the difference in reception timing of the same type of message included in the navigation message.

According to a fourth aspect of the present invention, the following GNSS receiving method is provided. That is, a navigation message is acquired by receiving a GNSS signal broadcast from a GNSS satellite. A positioning calculation is performed based on a propagation delay, which is a time required for the GNSS signal transmitted from the GNSS satellite, to reach an antenna. When an integer millisecond which is an integer portion when the propagation delay is expressed in milliseconds is different from a predefined value, it is determined that the received GNSS signal is a spoofed GNSS signal.

That is, since the position of the transmission source of the spoofed GNSS signal is significantly different from the position of the GNSS satellite which is the transmission source of the normal GNSS signal, the propagation delay of the spoofed GNSS signal may be significantly different from the normal GNSS signal. Therefore, the spoofed GNSS signal can be discriminated well by paying attention to the value of the propagation delay in integer milliseconds.

DETAILED DESCRIPTION

Figure 1:
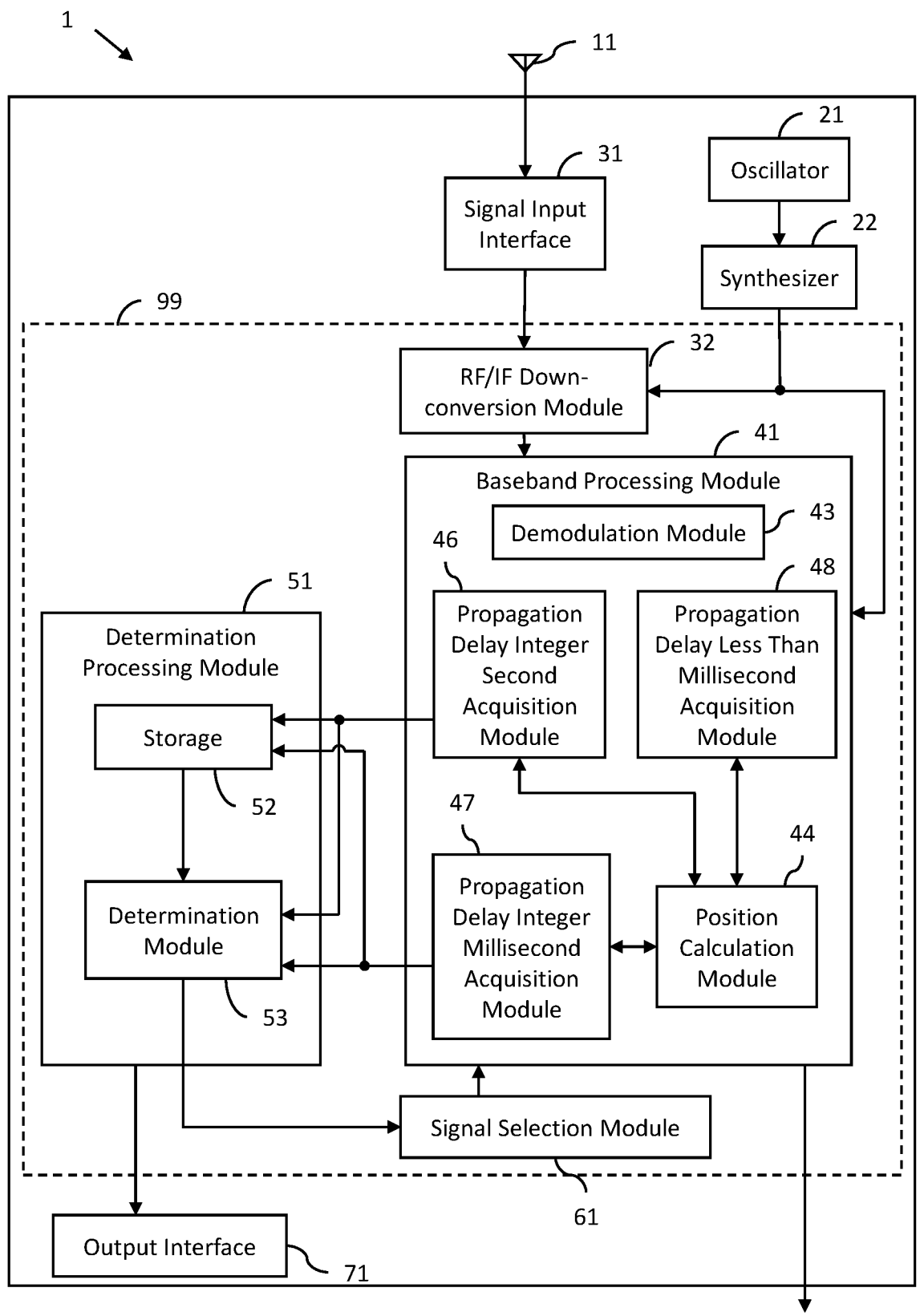
FIG. 1 is a block diagram showing an electrical configuration of a GNSS receiver according to a first embodiment of the present invention.

Next, an embodiment of the present invention will be described with reference to the drawings. FIG. 1 is a block diagram showing an electrical configuration of a GNSS receiver 1 according to an embodiment of the present invention.

The GNSS receiver 1 shown in FIG. 1 can acquire accurate position information and accurate GNSS time based on a received GNSS signal. The GNSS receiver 1 can be mounted, for example, on a car navigation system and used as a device for acquiring accurate position information. The GNSS receiver 1 can be installed in, for example, a communication base station and used as a device for acquiring GNSS time.

The GNSS receiver 1 determines whether the received GNSS signal is a normal GNSS signal or a spoofed GNSS signal, and performs positioning calculation by excluding the spoofed GNSS signal.

As used herein, the normal GNSS signal is a radio wave transmitted from a GNSS satellite. A spoofed GNSS signal is a radio wave transmitted from a source other than a GNSS satellite by someone imitating the GNSS signal. The spoofed GNSS signal is intended to simply confuse position information and time information acquired by the receiver, or to intentionally misinterpret a specific position and time different from the fact as the present position and the present time.

The GNSS receiver 1 is electrically connected with an antenna 11 capable of receiving GNSS signals. The configuration of the antenna 11 is arbitrary, and can be, for example, a patch antenna.

As shown in FIG. 1, the GNSS receiver 1 includes an oscillator 21, a synthesizer 22, a signal input interface 31, a Radio Frequency (RF)/Intermediate Frequency (IF) down-conversion module 32, a baseband processing module 41, a determination processing module 51, a signal selection module 61, and an output interface 71. The Radio Frequency (RF)/Intermediate Frequency (IF) down-conversion module 32, the baseband processing module 41, the determination processing module 51, and the signal selection module 61 may also be implemented as "processing circuitry" 99.

The oscillator 21 generates a signal of a predetermined frequency by oscillating an oscillator made of, for example, crystal. The oscillator 21 outputs the generated signal to the synthesizer 22.

The synthesizer 22 generates a clock signal of a predetermined frequency (clock frequency) based on the signal output from the oscillator 21. The synthesizer 22 outputs the generated clock signal to the RF/IF down-conversion module 32 and the baseband processing module 41.

The signal input interface 31 receives the GNSS signal received by the antenna 11. The signal input interface 31 may be, for example, a connector to which a signal cable connecting the antenna 11 and the GNSS receiver 1 is connected.

The RF/IF down-conversion module 32 converts the GNSS signal acquired by the signal input interface 31 into signal data that can be processed by the baseband processing module 41, which will be described later.

The RF/IF down-conversion module 32 includes a VCO (voltage controlled oscillator) and a mixer. The RF/IF down-conversion module 32 mixes the GNSS signal acquired by the signal input interface 31 and the output from the VCO controlled to match a phase of the clock frequency with a mixer. Thus, the RF/IF down-conversion module 32 can convert the frequency of the GNSS signal to an intermediate frequency that is a frequency division ratio multiple of the clock frequency.

The RF/IF down-conversion module 32 includes an amplifier and an A/D converter. The amplifier amplifies the GNSS signal converted to the intermediate frequency. The A/D converter converts the amplified GNSS signal into digital data. The RF/IF down-conversion module 32 outputs the digital data relating to the GNSS signal to the baseband processing module 41.

The baseband processing module 41 is configured as a known computer and includes a CPU, a ROM, a RAM, a correlator, and the like. The ROM stores a program for processing the GNSS signal, and the baseband processing module 41 operates based on the program.

The correlator of the baseband processing module 41 receives the signal data relating to the GNSS signal that is outputted from the RF/IF down-conversion module 32 and the clock signal from the synthesizer 22. The correlator obtains a correlation between a plurality of types of predetermined PRN codes (pseudo noise code) and GNSS signals while shifting timing of the PRN codes little by little. When the GNSS signal is received, the output of the correlator shows a peak at some timing that is a skew of a certain PRN code. Thus, the baseband processing module 41 specifies a PRN code number on which the GNSS signal is modulated, and specifies a reception timing of the PRN code.

Although the GNSS system is constructed by many GNSS satellites, the PRN code is unique to each GNSS satellite. Thus, identifying the PRN code number is synonymous with identifying the GNSS satellite corresponding to the received GNSS signal. A reception timing of the GNSS signal can be determined by specifying the reception timing of the PRN code.

The baseband processing module 41 performs arithmetic processing by a CPU on data input to the correlator. Thus, the GNSS signal modulated based on the PRN code can be demodulated.

The baseband processing module 41 includes a demodulation module 43 and a position calculation module 44. The demodulation module 43 acquires a navigation message based on the received GNSS signal. The position calculation module 44 obtains a current position of the antenna 11 by performing a known positioning calculation.

In the following, the specification of the reception timing and the positioning calculation of the GNSS signal by the baseband processing module 41 will be specifically described with reference to the case of the GPS as an example of the GNSS.

Each of the plurality of GNSS satellites transmits a signal called L1 wave (1,575.42 MHz) as a positioning signal. L1 signals include satellite orbit information and navigation messages, including time based on the satellite's highly accurate clock, phase-modulated with a PRN code that generates 1,023 chips at a chip rate of 1,023 MHz/chip with a period of 1 millisecond.

Each GNSS satellite repeatedly transmits a frame, which is a unit of navigation messages, without interruption. Sending 1 frame takes 30 seconds. One frame is divided into five sub-frames of six seconds each. Each sub-frame is constituted as a bit string of 300 bits in which orbit information and the like of the satellite are described, and is transmitted from the GNSS satellite at a rate of 50 bits per second for 6 seconds.

In each subframe, each time the PRN code with a period of 1 millisecond is repeated 20 times (i.e., in units of 20 milliseconds=1/50 seconds), the phase of the PRN code is inverted if there is a bit switch. In this way, the above-described information (bit string) can be transmitted by radio waves by the 2-stage phase modulation. The timing at which the GNSS satellite transmits a head (strictly speaking, the first bit of the first PRN code) of each subframe is synchronized with the positive second of the clock time (GNSS Time) of the GNSS satellite every 6 seconds.

A bit string of a predetermined synchronization pattern is described at the head of all the sub-frames. The baseband processing module 41 demodulates the sub-frame by using the PRN code specified by the correlator and searches for the start timing of the synchronization pattern, thereby obtaining the reception timing of the sub-frame.

Each sub-frame describes a GNSS time (hereinafter referred to as signal transmission GNSS time) indicating a transmission timing of the head of the sub-frame as a bit string. The baseband processing module 41 acquires a signal transmission GNSS time related to the subframe by demodulating the subframe.

The GNSS receiver 1 includes a clock (not shown) for measuring various timings. In the following description, this clock is sometimes referred to as a receiver clock. For example, the clock on the receiving side may use the clock signal.

Based on the signal transmission GNSS time obtained by demodulating the subframe and the reception timing of the subframe, the baseband processing module 41 acquires a time (propagation delay) required for the radio wave to reach the antenna 11 from the GNSS satellite.

The propagation delay is expressed as the time from the timing (hereinafter referred to as reference timing) at which the receiving-side clock indicates the same time as the signal transmission GNSS time to the timing at which the head of the subframe is received. Since the receiver side clock has an error, there is a deviation between the time of the receiver side clock and the GNSS time. The propagation delay includes an error between the receiver clock and GNSS time.

The propagation delay can be measured by dividing the time required for arrival of radio waves into an integer second part, an integer millisecond part, and a part less than the millisecond part. Specifically, the baseband processing module 41 includes a propagation delay integer second acquisition module 46, a propagation delay integer millisecond acquisition module 47, and a propagation delay less than millisecond acquisition module 48.

The propagation delay integer second acquisition module 46 acquires an integer second part of the propagation delay. This integer second portion can be obtained as an integer portion of the obtained quotient by dividing the result (count value) of the PRN code count as described later by the propagation delay integer millisecond acquisition module 47 by 1,000.

The propagation delay integer millisecond acquisition module 47 acquires an integer millisecond part (however, it shall be less than an integer second) of the propagation delay. This integer millisecond portion can be obtained as a remainder after counting how many times the PRN code is repeated from the reference timing to the reception timing at the beginning of the subframe and dividing the result (count value) by 1000.

The propagation delay less than millisecond acquisition module 48 can acquire a portion of the propagation delay less than the millisecond based on the timing at which the correlation of the PRN code becomes a peak in the correlator in the vicinity of the reference timing.

The portion less than a millisecond may be the low-order portion of the propagation delay number. The integer millisecond portion can be the high-order portion of the propagation delay number. The portion of integer second may be the higher order portion of the propagation delay number.

The baseband processing module 41 obtains the position of the GNSS satellite at the signal transmission GNSS time by calculating the position based on the orbit information of the satellite. The orbit information of the satellite can be obtained by demodulating a sub-frame.

The position calculation module 44 obtains the position of the GNSS satellite and the propagation delay of the GNSS signal from 4 or more GNSS satellites (In other words, the PRN code), and performs a known positioning calculation. Thus, the position of the antenna 11 (Longitude, Latitude, Elevation) and an error between the receiving-side clock and the GNSS time can be acquired. In the following description, the error between the receiving clock and the GNSS time is sometimes referred to as a clock error.

The radio wave travels about 300 kilometers in 1 millisecond, but it is usually unlikely that antenna 11 will physically travel that distance in a short time. Therefore, when the propagation delay (fraction of an integer second) of a certain GNSS signal is, for example, 67.890123 milliseconds in units of milliseconds and obtained by positioning calculation, it can be considered that the integer millisecond portion (67) does not change at all for a while after that, or does not increase or decrease by only 1 even if it changes. Similarly, the error between the receiver clock and the GNSS time can be considered to vary little on the order of milliseconds in a short time.

Therefore, after the positioning calculation is performed as described above, the propagation delay of the GNSS signal corresponding to the PRN code can be continuously obtained, only by continuously tracking how much the PRN code with a period of one millisecond is delayed with respect to the reference timing.

That is, since the PRN code is repeated in units of 1 millisecond, the portion of the propagation delay less than the millisecond can be obtained by simply obtaining the difference in the timing of the PRN code with respect to the reference timing, but the integer millisecond cannot be specified. However, once the ambiguity of the integer millisecond is resolved by positioning calculation, the propagation delay of the GNSS signal can be easily determined including the integer millisecond portion and the portion of the GNSS signal of which the propagation delay is less than the millisecond portion by only obtaining the difference of the timing of the PRN code with respect to the reference timing by the propagation delay less than millisecond acquisition module 48 (That is, the propagation delay integer millisecond acquisition module 47 is not operated.).

However, the baseband processing module 41 of the present embodiment calculates the propagation delay without using the above method in consideration of the possibility of receiving spoofed GNSS signals. Immediately, the propagation delay integer millisecond acquisition module 47 continuously acquires the integer millisecond portion of the propagation delay in the same manner as described above, even after the integer millisecond portion of the GNSS signal of a certain PRN code is once obtained by positioning calculation.

The propagation delay less than millisecond acquisition module 48 obtains the difference in the timing of the PRN code with respect to the reference timing as described above.

Thus, a portion of the propagation delay of less than milliseconds can be acquired.

The baseband processing module 41 outputs the integer second portion acquired by the propagation delay integer second acquisition module 46 and the integer millisecond portion acquired by the propagation delay integer millisecond acquisition module 47 to the determination processing module 51 from among the propagation delays obtained for each GNSS signal. At this time, the values outputted by the propagation delay integer second acquisition module 46 and the propagation delay integer millisecond acquisition module 47 are converted into values based on GNSS time using the clock error obtained by the positioning calculation.

The determination processing module 51 determines whether the received GNSS signal is a normal GNSS signal or a spoofed GNSS signal based on the data input from the baseband processing module 41. Specifically, when the integer second portion of the propagation delay obtained for the GNSS signal is out of the range of a predicted time threshold, the determination processing module 51 determines that the received GNSS signal is a spoofed GNSS signal. Further, the determination processing module 51 determines that the received GNSS signal is a spoofed GNSS signal when an integer millisecond portion of the propagation delay obtained for the GNSS signal is different from a value to be passed.

The determination processing module 51 includes a storage 52 and a determination module 53.

The storage 52 can store the reception timing of the navigation message used for determination. More specifically, the storage 52 stores the timing at which a message of a previously designated type (in the following description, may be referred to as a predetermined message) is received in a message included in the navigation message. The storage 52 stores reference timing as reception timing of a prescribed message in integer seconds on the basis of the integer seconds acquired by the propagation delay integer second acquisition module 46. The storage 52 outputs the stored reference timing to the determination module 53.

The storage 52 can store a plurality of integer millisecond values of the propagation delay inputted from the baseband processing module 41 for each GNSS satellite (in other words, for each PRN code). The storage 52 determines a range in which an integer millisecond value of the radio wave delay of the GNSS signal of the PRN code should normally enter from the accumulated integer millisecond value, and outputs the range to the determination module 53.

The determination module 53 determines whether or not a normal GNSS signal is received by using the difference between the reception timing (integer seconds) of the next predetermined message predicted from the reception timing (integer seconds) of the predetermined message stored in the storage 52 and the timing (integer seconds) when the next predetermined message is actually received.

That is, as described above, the frame that is the unit of the navigation message is repeated exactly every 30 seconds. Therefore, when the reception timing (integer seconds value) at the beginning of a certain frame is, for example, 1860, the reception timing (integer seconds value) at the beginning of the next frame can be predicted to be 1890. However, when the next frame is actually received, the value of an integer second indicating the reception timing of the head of the frame is 1873. Since it is unnatural that the head of the frame is received at such a timing, the frame received at the timing of 1873 can be considered as a spoofed GNSS signal instead of a normal GNSS signal.

In the present embodiment, it is determined whether or not the GNSS signal is a spoofed GNSS signal by utilizing the fact that the frame of the navigation message is accurately repeated in a period of 30 seconds as described above. Specifically, when the difference between the predicted reception timing and the actual reception timing is within a predetermined time threshold range (e.g., within +/−5 seconds), the determination module 53 determines that the normal GNSS signal is currently received. On the other hand, if the difference in the reception timing is outside the time threshold, the determination module 53 determines that the spoofed GNSS signal is currently received. When it is determined that the spoofed GNSS signal is received, the determination module 53 determines that the GNSS signal including the subsequent navigation message is the spoofed GNSS signal until the timing difference falls within the predefined time threshold range again. The determination result of the determination module 53 is input to the signal selection module 61.

When the determination module 53 determines that a normal GNSS signal is received, the determination module 53 uses the reception timing of the head of the frame as a reference for predicting the timing of the head of the next frame. That is, the reference timing, which is the stored content of the storage 52, is updated at the reception timing (integer seconds value) of the newly received frame. Then, the determination module 53 predicts the reception timing of the head of the next frame from the new reference timing, and determines the resulting GNSS signal.

On the other hand, when the determination module 53 determines that the spoofed GNSS signal is received, the reference timing stored in the storage 52 is not updated depending on the reception timing of the frame. Instead, the determination module 53 updates the reference timing stored in the storage 52 by adding the frame period 30 to the previous reference timing. Thus, it is possible to avoid using a spoofed GNSS signal as a reference.

Further, the determination module 53 determines whether or not the integer millisecond of the propagation delay input from the baseband processing module 41 is included in the integer millisecond of the propagation delay to be satisfied by the normal GNSS signal obtained by the storage 52 for each GNSS signal (PRN Code).

When the integer millisecond of the propagation delay obtained from the baseband processing module 41 for a certain PRN code falls within the range obtained from the storage 52, the determination module 53 determines that the signal of the PRN code is a normal GNSS signal. On the other hand, when the integer millisecond of the propagation delay obtained from the baseband processing module 41 is out of the range obtained from the storage 52, the determination module 53 determines that the PRN code signal is a spoofed GNSS signal. The determination result of the determination module 53 is input to the signal selection module 61.

The determination processing module 51 outputs an alarm signal when a determination module 53 detects the spoofed GNSS signal. Based on the alarm signal, the output interface 71 provided in the GNSS receiver 1 can notify a user that the spoofed GNSS signal has been received to alert the user. The alarm signal may be output to an external device.

The output interface 71 can output information about spoofed GNSS signals for each satellite to the outside. The configuration of the output interface 71 is not particularly limited as long as it can alert the user. For example, the output interface 71 may be a lamp that lights up or a buzzer that emits a sound. The output interface 71 may be a display device that outputs a sentence indicating the fact.

The signal selection module 61 receives a determination result from the determination module 51 of the determination processing module 53. The signal selection module 61 selects a PRN code other than the one determined as the spoofed GNSS signal by the determination module 53 out of the PRN codes of the GNSS signal detected by the correlator in the baseband processing module 41. The signal selection module 61 outputs the selection result (specifically, the PRN code number) to the baseband processing module 41.

The position calculation module 44 of the baseband processing module 41 performs positioning calculation by using only GNSS signals of PRN codes selected by the signal selection module 61. As a result, the clock error is recalculated. The recalculated clock error is more accurate than the original clock error because the effect of the spoofed GNSS signal is eliminated.

The GNSS receiver 1 determines whether a received GNSS signal is a normal GNSS signal or a spoofed GNSS signal, and the position calculation module 44 performs positioning calculation in a form excluding the spoofed GNSS signal reducing positioning accuracy. Therefore, it is possible to avoid the influence of the spoofing signal and to output highly accurate information.

It should be noted that whether or not the received GNSS signal is a spoofed GNSS signal can be determined from various viewpoints as shown in (1) to (5) below, in addition to or instead of determining the value of the propagation delay in integer seconds and/or integer milliseconds.

(1) For example, when the received signal strength of the GNSS signal relating to a certain PRN code is equal to or greater than a predetermined threshold value (for example, −110 dBm), it is not considered that the radio wave from the GNSS satellite is observed so strongly. Therefore, the determination processing module 51 determines that the GNSS signal related to the PRN code is a spoofed GNSS signal.

(2) For example, if the received signal strength of GNSS signals for a certain number of PRN codes is almost the same, it is suspected that GNSS signals composed of a plurality of PRN codes are transmitted from a single transmission source. Therefore, the determination processing module 51 determines that the GNSS signal related to the PRN code is a spoofed GNSS signal.

(3) For example, suppose that the GNSS signals of two PRN codes are received, and the satellite corresponding to one PRN code is located at a high elevation angle according to the satellite orbit information, and the satellite corresponding to the other PRN code is located at a low elevation angle according to the satellite orbit information. On the other hand, it is assumed that a C/No of the GNSS signal at a higher elevation angle of the satellite is smaller than a C/No of the GNSS signal at a lower elevation angle. C/No is the carrier to noise power density ratio, which in effect means signal strength. It is unnatural that the signal strength of the GNSS signal decreases even though the GNSS satellite has a high elevation angle. Therefore, the determination processing module 51 determines that the GNSS signal relating to at least one of the 2 PRN codes is a spoofed GNSS signal.

(4) For example, suppose that a GNSS signal of a certain PRN code is continuously received, but the C/No of the GNSS signal hardly changes even after a predetermined time has elapsed. It is unnatural that the C/No does not fluctuate for a long time even though the GNSS satellite moves according to a predetermined orbit with the passage of time and the elevation angle should change. Therefore, the determination processing module 51 determines that the GNSS signal related to the PRN code is a spoofed GNSS signal.

(5) For example, on the assumption that the antenna 11 for receiving the GNSS signal is fixedly installed, it is assumed that the position of the antenna 11 obtained from the result of the positioning calculation by the position calculation module 44 is changed by a predetermined value or more. Since the position of the antenna 11 is fixed, it is unnatural that the position indicated by the positioning result varies. Therefore, the determination processing module 51 determines that at least one of the GNSS signals used for the positioning calculation is a spoofed GNSS signal. The object for comparing the position of the antenna 11 obtained by the positioning calculation may be a preset position or the position of the antenna 11 obtained by the latest positioning calculation in the past.

The detection of the spoofed GNSS signal can be satisfactorily performed by performing the above determination in addition to or instead of the determination regarding the integer milliseconds of the propagation delay. A plurality of determinations (1) to (5) may be combined.

As described above, the GNSS receiver 1 of this embodiment includes the demodulation module 43, the position calculation module 44, and the determination module 53. The demodulation module 43 receives the GNSS signal transmitted from the GNSS satellite and acquires a navigation message. The position calculation module 44 performs positioning calculation on the basis of the propagation delay which is the time until the GNSS signal transmitted from the GNSS satellite reaches the antenna 11. The determination module 53 determines that the received GNSS signal is a spoofed GNSS signal when an integer millisecond which is an integer portion when the propagation delay is expressed in milliseconds does not satisfy the condition.

That is, since the position of the transmission source of the spoofed GNSS signal is significantly different from the position of the GNSS satellite which is the transmission source of the normal GNSS signal, the propagation delay of the spoofed GNSS signal may be significantly different from the normal GNSS signal. Therefore, the spoofed GNSS signal can be discriminated well by paying attention to the value of the propagation delay in integer milliseconds.

The GNSS receiver 1 of the present embodiment includes the storage 52. The storage 52 stores reference timing as timing of receiving a message of a predetermined type among navigation messages. When the timing difference, which is the difference between the reception timing of the next and subsequent messages of the same type predicted based on the reference timing stored by the storage 52 and the timing of receiving the same type of messages after the reference timing, is outside the range of a predetermined time threshold range, the determination module 53 determines that the GNSS signal including the subsequent navigation messages is a spoofed GNSS signal until the timing difference falls within the range of the predetermined time threshold range.

It is immediately conceivable that the spoofed GNSS signal is received at a timing different from the reception period of the normal GNSS signal. Therefore, the reception timing of the navigation message relating to the spoofed GNSS signal may largely deviate from the period of the reception timing of the navigation message relating to the normal GNSS signal. Therefore, the spoofing GNSS signal can be discriminated well by paying attention to the difference in reception timing of the same type of messages included in the navigation message.

Figure 2:
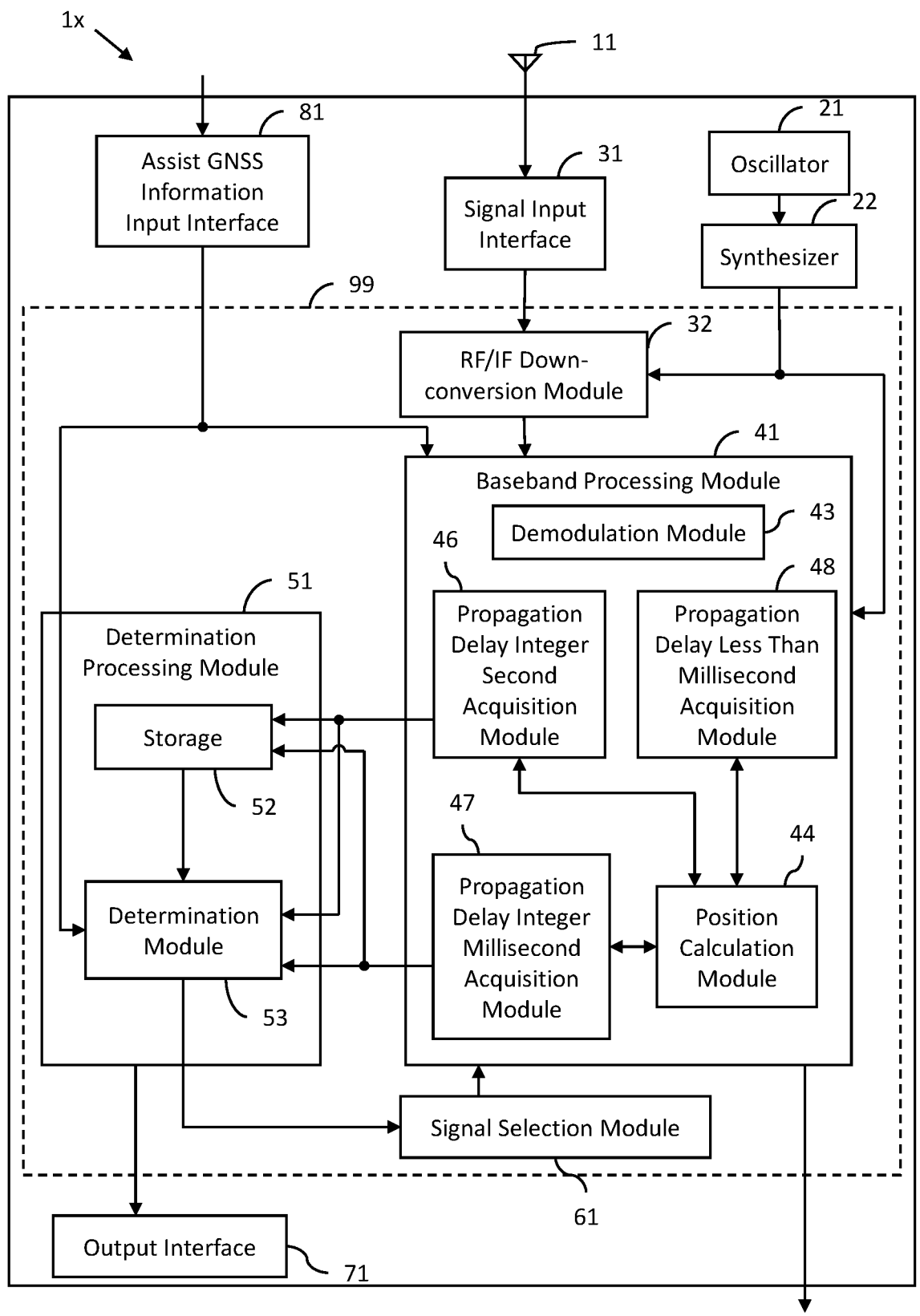
FIG. 2 is a block diagram showing an electrical configuration of a GNSS receiver according to a second embodiment of the present invention.

Next, a second embodiment will be described. FIG. 2 is a block diagram showing an electrical configuration of a GNSS receiver 1x according to a second embodiment of the present invention. In the description of this embodiment, the same or similar members as those in the above-described embodiment are denoted by the same reference numerals in the drawings, and the description thereof may be omitted.

The GNSS receiver 1x of the present embodiment shown in FIG. 2 includes an assist GNSS information input interface (assist GNSS information acquisition module) 81.

The assist GNSS information input interface 81 is configured to be capable of communicating with an information distribution server (not shown) via a communication network using a wire or a radio. The assist GNSS information input interface 81 inputs assist GNSS information including, for example, satellite orbit information from an information distribution server. By performing high-speed communication between the assist GNSS information input interface 81 and the information distribution server, information necessary for positioning can be acquired in a shorter time than in the case of obtaining orbit information or the like of a satellite at a rate of 50 bits per second by demodulating a GNSS signal. The assist GNSS information input interface 81 outputs the acquired orbit information of the satellite to the baseband processing module 41 and the determination processing module 51.

Although the assist GNSS information input from the assist GNSS information input interface 81 to the baseband processing module 41 includes satellite orbit information, the baseband processing module 41 acquires the satellite orbit information by demodulating a sub-frame of the GNSS received signal. The baseband processing module 41 acquires the satellite orbit information described in the GNSS reception signal for each PRN code, and outputs it to the determination processing module 51.

The determination module 53 of the determination processing module 51 determines an integer millisecond regarding the propagation delay described above, and further determines the consistency of the satellite orbit information. That is, if the satellite orbit information obtained by the assist GNSS information and the satellite orbit information obtained by demodulating the GNSS reception signal are substantially the same on the assumption that the information distribution server providing the assist GNSS information is reliable, the determination module 53 determines that the GNSS reception signal related to the PRN code is a normal GNSS signal, and if not, the determination module 53 determines that the GNSS reception signal related to the PRN code is a spoofed GNSS signal.

The format of the satellite orbit information described in the GNSS assist information provided by the information distribution server may be different from the format of the satellite orbit information obtained from the GNSS received signal. In this case, the determination processing module 51 calculates an azimuth angle and an elevation angle of the satellite as viewed from the position of the antenna 11 obtained by the positioning calculation, for example, based on both satellite orbit information, and can determine the substantial identity of the satellite orbit information based on whether or not the difference between the obtained azimuth angle and the elevation angle is within a predetermined range.

The GNSS assist information provided by the information distribution server may include, for example, satellite health information, clock time correction information provided by the satellite, leap second information, and the like. In this case, the determination processing module 51 compares at least any of the above information between the GNSS assist information and the information obtained by demodulating the GNSS received signal, and if there is a difference, it can determine that the GNSS received signal relating to the PRN code is a spoofed GNSS signal.

Although the preferred embodiment of the present invention has been described above, the above-described configuration can be changed, for example, as follows.

If the location at which antenna 11 is installed is known in advance, for each GNSS satellite of PRN code, the range within which an integer millisecond of propagation delay should normally be taken can be determined in advance. The determination processing module 51 may use this range to determine the spoofed GNSS signal.

The storage 52 may be configured to store an average value of the obtained integer milliseconds instead of storing a plurality of integer milliseconds. The determination processing module 51 can determine that the GNSS signal is spoofed if an integer millisecond of propagation delay does not fall within a predetermined range centering on the average value.

The determination processing module 51 and the signal selection module 61 may be implemented by a CPU, ROM, RAM, or the like included in the baseband processing module 41, or may be implemented by other hardware included in the GNSS receiver 1.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:
1. A GNSS receiver comprising:
    processing circuitry configured to:
        receive a GNSS signal broadcast from a GNSS satellite and to acquire a navigation message;
        perform positioning calculation on the basis of a propagation delay, which is a time required for the GNSS signal transmitted from the GNSS satellite, to reach an antenna;
        store a reference timing that is a timing at which a navigation message of a predetermined type is received; and
        determine that a GNSS signal including a subsequent navigation message is a spoofed GNSS signal when a timing difference, which is a difference between predicted reception timing of the next and subsequent navigation messages of same type predicted based on the stored reference timing and actual reception timing of navigation messages of same type after the reference timing, deviates from a predetermined time threshold range, until the timing difference falls within the predetermined time threshold range, wherein when the GNSS signal is not determined to be the spoofed GNSS signal, the reference timing is updated based on the actual reception timing of the navigation messages, and when the GNSS signal is determined to be the spoofed GNSS signal, the reference timing is not updated based on the actual reception timing of the navigation messages.

2. The GNSS receiver according to claim 1, further comprising:

an output interface configured to output acquired information to an external device, wherein the processing circuitry determines for each satellite whether the GNSS signal is the spoofed GNSS signal, and the output interface outputs the acquired information on spoofed GNSS signals for each satellite to the external device.

3. The GNSS receiver according to claim 2, wherein the antenna configured to receive the GNSS signal is fixedly installed, and the processing circuitry determines that at least one of a plurality of received GNSS signals is a spoofed GNSS signal when a current antenna position obtained by positioning calculation using the plurality of received GNSS signals, varies by a predetermined amount or more from a preset antenna position or an antenna position obtained by past positioning calculation.

4. The GNSS receiver according to claim 2, wherein the processing circuitry is further configured to select a GNSS signal of the plurality of received GNSS signals that is not determined to be a spoofed GNSS signal, and the GNSS receiver performs positioning calculation by using the GNSS signal selected by the processing circuitry.

5. The GNSS receiver according to claim 2, further comprising:

an assist GNSS input interface configured to acquire assist GNSS information, wherein the processing circuitry determines that the received GNSS signal is a spoofed GNSS signal when there is a difference between information obtained by demodulating the received GNSS signal and information obtained from the assist GNSS information with respect to at least one of satellite orbit information, satellite health information, clock time correction information provided by the satellite, and leap second information.

6. The GNSS receiver according to claim 1, wherein the antenna configured to receive the GNSS signal is fixedly installed, and the processing circuitry determines that at least one of a plurality of received GNSS signals is a spoofed GNSS signal when a current antenna position obtained by positioning calculation using the plurality of received GNSS signals, varies by a predetermined amount or more from a preset antenna position or an antenna position obtained by past positioning calculation.

7. The GNSS receiver according to claim 6, wherein the processing circuitry is further configured to select a GNSS signal of the plurality of received GNSS signals that is not determined to be a spoofed GNSS signal, and the GNSS receiver performs positioning calculation by using the GNSS signal selected by the processing circuitry.

8. The GNSS receiver according to claim 6, further comprising:

an assist GNSS input interface configured to acquire assist GNSS information, wherein the processing circuitry determines that the received GNSS signal is a spoofed GNSS signal when there is a difference between information obtained by demodulating the received GNSS signal and information obtained from the assist GNSS information with respect to at least one of satellite orbit information, satellite health information, clock time correction information provided by the satellite, and leap second information.

9. The GNSS receiver according to claim 1, wherein the processing circuitry is further configured to select a GNSS signal of the plurality of received GNSS signals that is not determined to be a spoofed GNSS signal, and the GNSS receiver performs positioning calculation by using the GNSS signal selected by the processing circuitry.

10. The GNSS receiver according to claim 9, further comprising:

an assist GNSS input interface configured to acquire assist GNSS information, wherein the processing circuitry determines that the received GNSS signal is a spoofed GNSS signal when there is a difference between information obtained by demodulating the received GNSS signal and information obtained from the assist GNSS information with respect to at least one of satellite orbit information, satellite health information, clock time correction information provided by the satellite, and leap second information.

11. The GNSS receiver according to claim 1, further comprising:

an assist GNSS input interface configured to acquire assist GNSS information, wherein the processing circuitry determines that the received GNSS signal is a spoofed GNSS signal when there is a difference between information obtained by demodulating the received GNSS signal and information obtained from the assist GNSS information with respect to at least one of satellite orbit information, satellite health information, clock time correction information provided by the satellite, and leap second information.

12. The GNSS receiver according to claim 1, wherein the processing circuitry determines that the received GNSS signal is a spoofed GNSS signal when a signal strength of the received GNSS signal is equal to or greater than a corresponding threshold value.

13. The GNSS receiver according to claim 1, wherein the processing circuitry determines that the GNSS signals of a plurality of PRN codes are spoofed GNSS signals when a difference in signal strengths of the GNSS signals relating to the plurality of PRN codes is within a corresponding threshold value.

14. The GNSS receiver according to claim 1, wherein when the GNSS signals of first and second PRN codes of the plurality of PRN codes, are respectively received, an elevation angle obtained from orbit information for the satellite corresponding to the first PRN code is higher than an elevation angle obtained from orbit information for the satellite corresponding to the second PRN code, and when the signal strength of the GNSS signal of the first PRN code is smaller than the signal strength of the GNSS signal of the second PRN code, the processing circuitry determines that at least one of the GNSS signal of the first PRN code or the GNSS signal of the second PRN code is a spoofed GNSS signal.

15. The GNSS receiver according to claim 1, wherein the processing circuitry determines that the GNSS signal is a spoofed GNSS signal when a change of the signal strength of the received GNSS signal within a predetermined time period is within a corresponding threshold value.

16. A GNSS receiving method, comprising:

receiving a GNSS signal broadcast from a GNSS satellite and acquiring a navigation message;

performing positioning calculation on the basis of a propagation delay, which is a time required for the GNSS signal transmitted from the GNSS satellite, to reach an antenna;

storing a reference timing which is a timing at which a navigation message of a predetermined type is received; and determining that a GNSS signal including a subsequent navigation message is a spoofed GNSS signal when a timing difference, which is a difference between predicted reception timing of next and subsequent navigation messages of same type predicted based on the stored reference timing and actual reception timing of navigation messages of the same type after the reference timing, deviates from a predetermined time threshold range, until the timing difference falls within the predetermined time threshold range, wherein when the GNSS signal is not determined to be the spoofed GNSS signal, the reference timing is updated based on the actual reception timing of the navigation messages, and when the GNSS signal is determined to be the spoofed GNSS signal, the reference timing is not updated based on the actual reception timing of the navigation messages.

\* \* \* \* \*